April 5, 1966   LE ROY R. BOGGS   3,244,784
METHOD FOR FORMING FIBRE REINFORCED RESIN ARTICLES
Original Filed Jan. 15, 1960   2 Sheets-Sheet 1
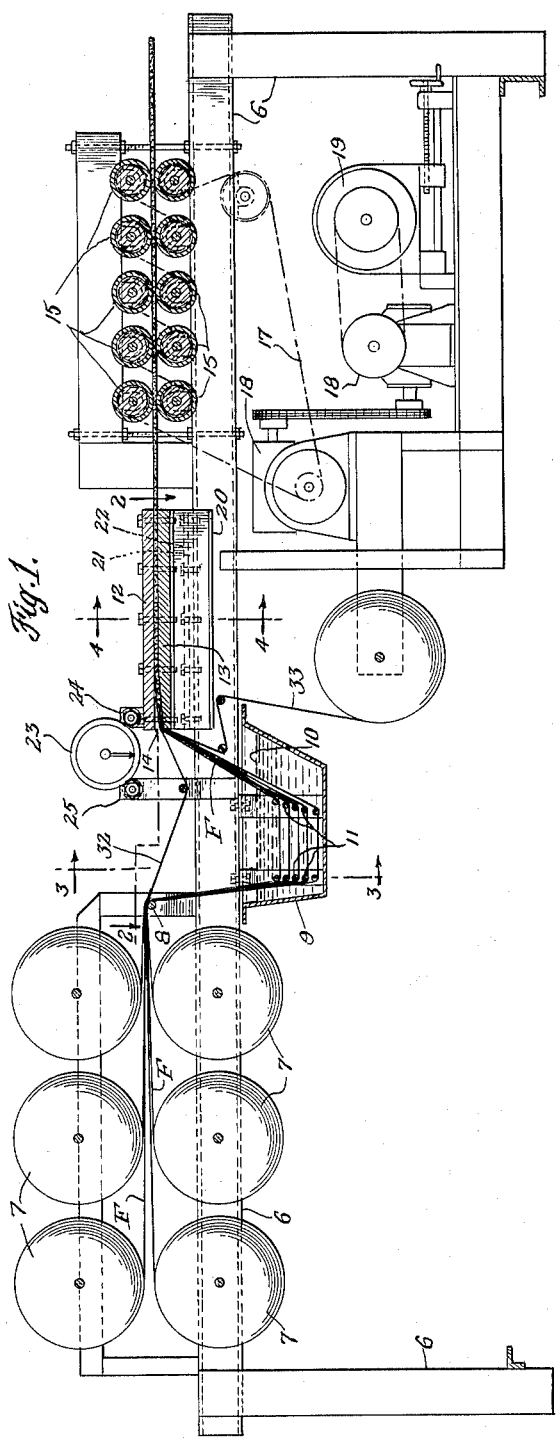
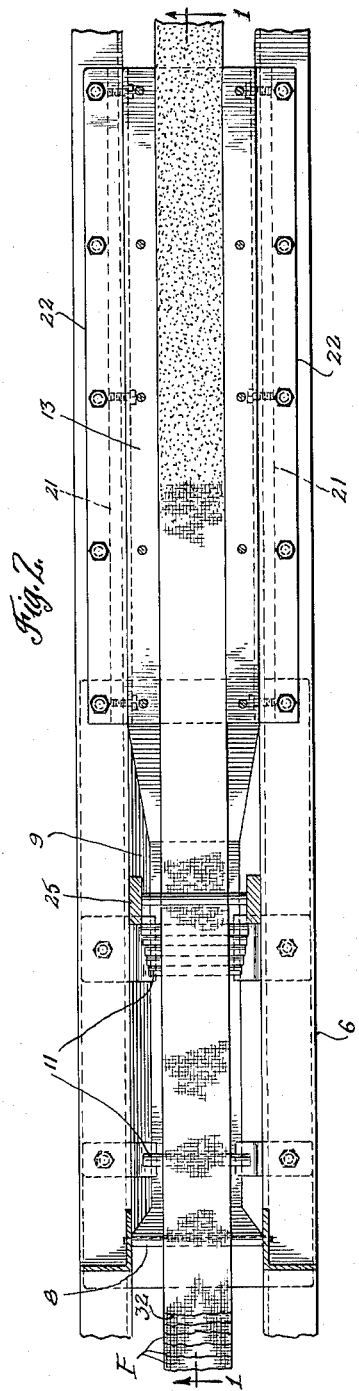
INVENTOR
Le Roy R. Boggs
By
Synnestvedt & Lechner
ATTORNEYS April 5, 1966  LE ROY R. BOGGS  3,244,784
METHOD FOR FORMING FIBRE REINFORCED RESIN ARTICLES
Original Filed Jan. 15, 1960  2 Sheets-Sheet 2
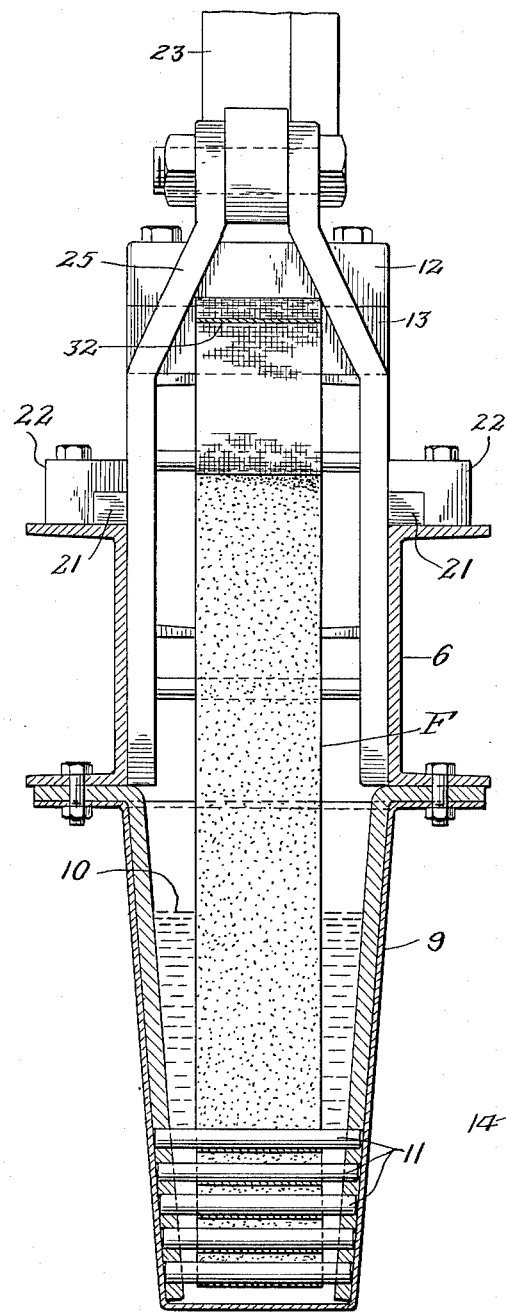
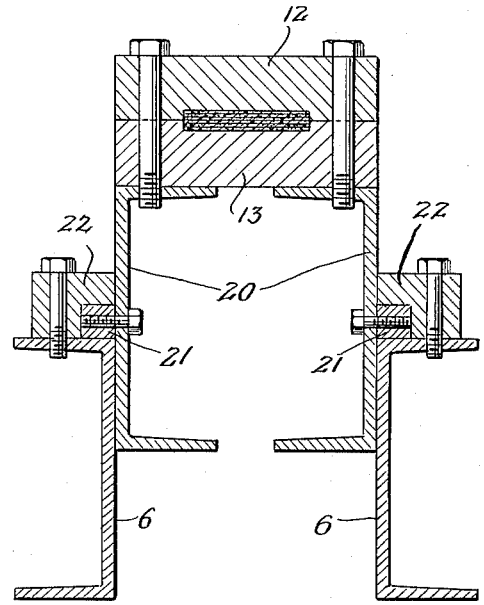
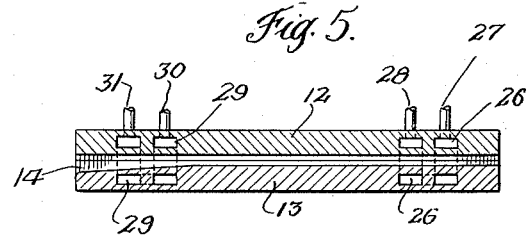
INVENTOR
LeRoy R. Boggs
By Synnestvedt & Lechner
ATTORNEYS United States Patent Office 3,244,784
Patented Apr. 5, 1966

3,244,784
METHOD FOR FORMING FIBRE REINFORCED RESIN ARTICLES
Le Roy R. Boggs, Bristol, Tenn., assignor to Universal Moulded Fiber Glass Corp., Bristol, Va., a corporation of Delaware
Continuation of abandoned application Ser. No. 2,760, Jan. 15, 1960. This application Nov. 3, 1964, Ser. No. 408,488
2 Claims. (Cl. 264—137)

This application is a continuation of my prior application, Serial No. 2,760, filed January 15, 1960, now abandoned.

This invention relates to the manufacture of article from fibre reinforced plastic or resin materials, and the invention is especially concerned with the continuous, rather than intermittent or piecemeal fabrication of elongated shapes or articles composed of fibrous or fabric material imbedded in a resin or plastic. The invention is adaptable to the fabrication of a variety of shapes including strips, angles, bars, rods, channeled members, tubular members and many other shapes.

The advantage of various articles and structural pieces made of fibre reinforced plastic has been recognized, but generally speaking, the production of such reinforced plastic articles or shapes has heretofore been effected by discontinuous methods, such as molding. In a typical known operation, a mat of fibres, such as glass fibres are laid upon a form or within a mold, resin in liquid or semi-liquid state is applied, and the article is then heat cured, usually under some pressure, for instance by means of mating mold pieces.

According to the present invention an exceedingly simple method is provided for the continuous production of a wide variety of shapes from fibre reinforced plastic materials. In addition to rapidity and economy of production, the method and apparatus of the present invention have certain additional important advantages, including the fact that elongated pieces or articles of many different shapes may readily be formed, even including articles having reentrant grooves or channels therein. Many such articles are difficult if not impossible to produce by the known mating mold techniques.

In a typical operation according to the present invention, a woven fabric strip formed of glass fibres is drawn through a liquid resin impregnating bath and then through a confining channel in a forming device, the material being heated in the forming device and the rate of feed being such as to effect curing of the resin to the solid stage during its passage through the forming device. Fibre reinforced plastic strip may readily be fabricated in this way in a continuous manner, the strip article being completed upon delivery from the forming device and being wound for example in a coil or, if desired, cut off to lengths according to a specific use.

How the foregoing objects and advantages, as well as others which will occur to those skilled in the art, are attained, will be clear from the following description referring to the accompanying drawings which illustrate a preferred embodiment of apparatus according to the invention and which show a preferred embodiment of the method being carried out in said apparatus.

In the drawings:

FIGURE 1 is an elevational view, with certain parts in vertical section, showing a machine constructed according to the invention for the continuous manufacture of fibre reinforced resin strip, the sectional parts of this view being taken in the vertical plane indicated by the line 1—1 on FIGURE 2;

FIGURE 2 is a plan view of a portion of the apparatus shown in FIGURE 1, this view being on an enlarged scale and being taken as indicated by the line 2—2 on FIGURE 1, with certain parts shown in horizontal section and with upper parts removed, for the sake of clarity;

FIGURE 3 is a transverse sectional view taken as indicated by the section line 3—3 on FIGURE 1, this view being on an enlarged scale as compared with the scales of both FIGURE 1 and FIGURE 2;

FIGURE 4 is a view on the scale of FIGURE 3 but taken as indicated by the section line 4—4 on FIGURE 1; and FIGURE 5 is a view of the forming device shown in FIGURE 1, on a somewhat enlarged scale, and further illustrating certain heat transfer passages provided in the walls of the forming device.

Referring now to the drawings, the reference numerals 6 designate a main frame or support structure for the apparatus. A plurality of spools 7 are shown for supplying fibre reinforcing material, in the case shown, this material constituting woven Fiberglas strips F. The fabric strips from these supply spools 7 are fed horizontally over a guide 8 and thence downwardly into an impregnating reservoir 9 adapted to contain a supply of a heat hardenable resin in liquid state, as indicated at 10. The several fabric strips are passed over separated pairs of guides 11 provided below the surface of the resin in the reservoir 9, in order to insure thorough impregnation of each strip with the resin. The several strips are then drawn upwardly and out of the reservoir and into the entrance end of a forming device, upper and lower portions of which are indicated at 12 and 13. As best seen in FIGURES 4 and 5, the upper and lower parts of the forming device are shaped to provide a confining channel therebetween, through which the impregnated strips are drawn. Toward its entrance end, the confining channel in the forming device is tapered to provide an enlarged inlet opening as is clearly shown at 14 in FIGURE 5.

The main portion of the channel, i.e., beyond the tapered entrance portion, is preferably of substantially uniform cross section and preferably also substantially straight to aid in forming a straight and accurately dimensional piece.

Beyond the delivery end of the channel in the forming device, there are arranged a plurality of pairs of friction rolls or rollers 15 between which the completed strip is passed, and by means of which the strip is drawn through the forming device. Thus, these feed rolls at the delivery end of the apparatus serve to draw the reinforcing fibrous strips from the supply spools and also to draw those strips through the impregnating bath, as well as to draw the strip being formed through the forming device. The feed rolls 15 are preferably driven by means of a belt or chain such as indicated at 17 which is actuated through one or more reduction gearing units 18, connected with a motor 19. Although five pairs of drawing or feeding rollers are illustrated, in most instances it would not be required to employ any such large number, as the force required for drawing the formed strip through the forming device generally is not very great. Indeed, in the case of a simple flat strip, a force sufficient to draw the strip through the forming device may be applied even by direct hand pull, but for constancy of pull the use of feed rolls is preferred. Moreover, mechanisms other than rolls may be used for drawing out the formed article.

As shown in FIGURE 4 the forming device 12–13 is mounted by means of a pair of channel members 20 which carry guides 21 working in guide slots formed by means of brackets 22 mounted to the top flanges of the main frame channels 6. The forming device is thus mounted with freedom for movement in a direction generally parallel the direction of movement of the strip being formed through the channel in the forming device. A gauge for measuring the pull being exerted on the strip by the feed rolls 15 is indicated at 23, this gauge being connected by means of a bracket 24 to the forming device and also to a fixed anchor point 25. In operation, the slide mounting of the forming device (as described just above with reference to FIGURE 4), together with the gauge 23, permits continuous direct reading of the pull required for delivery of the strip through and from the forming device.

Although the apparatus has been illustrated and described as positioned for generally horizontal feed of the materials and the formed article, it will be understood that it may be differently arranged.

In general, it is preferred to employ heat settable or heat hardenable resin or plastic materials having a liquid stage before curing and a solid stage after curing. Thermosetting polyester laminating resins are effectively used, for instance the resin identified P-43 as marketed by Rohm and Haas Co. Such a resin is advantageously used with a small quantity, for instance about 1% of a hardener, such as benzol peroxide. For such heat hardenable resin or plastic materials, the invention contemplates heating the forming device. While this may be done in a variety of ways, such as by electric heating elements, it may be done by circulation of a heat transfer medium through channels formed in the upper and lower parts 12 and 13 of the forming device, for instance channels such as indicated at 26 in FIGURE 5, having an inlet 27 and an outlet 28. As the forming device is preferably formed of metal, the heat applied tends to be conducted throughout the body of the forming device, and I have found that heating of the forming device throughout the entire length of the confining channel has a tendency to cause the resin material to prematurely cure in the entrance end portions of the channel and to stick or jam therein. With this in mind, I prefer to establish a temperature gradient throughout the length of the confining channel, with the low end of the temperature scale toward the entrance end of the channel, and with the high end of the temperature scale toward the exit end of the channel. This is desirably accomplished by employment of a heating means associated with the exit end portions of the forming device, while at the same time providing cooling means associated with the inlet end portions of the forming device. The cooling means may take a variety of forms, but advantageously comprise channels 29 for circulation of cooling liquid, for instance, water at ordinary water supply temperatures or, if desired, refrigerated, the cooling passages being provided with inlet 30 and an outlet 31 as shown in FIGURE 5.

Although with certain articles or shapes, all of the fibrous material employed may be impregnated prior to passage through the forming device, for many purposes it is desirable to feed to the forming device certain fibrous material in unimpregnated condition. For example, the feeding of strips such as indicated at 32 and 33 at opposite faces of the impregnated strips F improves the smoothness of operation and tends to minimize sticking in the forming device even though these strips become saturated or impregnated by contact with the impregnated strips by the time they pass part way through the forming device. The entire article therefore at the delivery end of the apparatus has a structure which is sound or substantially free of porosity throughout the cross section thereof, notwithstanding the fact that certain marginal or surface strips are initially fed in unimpregnated condition.

The importance of employing unimpregnated strips or fibrous material at certain surfaces of the article being formed depends somewhat upon the cross sectional shape of the article. For example, in the case of a piece having angles or corners, resin material sometimes tends to deposit and accumulate in the corners and the feed of unimpregnated fibrous material through those corners tends to sweep out particles of resin tending to be deposited there. For this same purpose I have found it to be desirable, in the case of formation of relatively thin strip, to feed fibrous material, for example in the form of Fiberglas roving, in unimpregnated form at the two edges of the strip.

This feed of impregnated and unimpregnated strip or other fibrous material may be altered in various ways, according to the shape of the article being formed.

It should further be understood that the form of the fibrous material may be varied. Indeed, the fibrous material may be fed in the form of woven strip, as already mentioned above, or it may be fed in the form of Fiberglas mat. Still further, a multiplicity of threads or rovings may be fed, instead of one or more mats or strips. For certain purposes, certain other types of fibrous material may be employed, i.e., other than glass. Moreover, certain other materials or pieces may be fed along with the reinforcing fibres, such as metal pieces, wood strips or the like.

As above indicated the strip or other article being formed may be continuously delivered from the apparatus and may be wound in a coil, or may be cut off to desired lengths. In the latter event, and also for any other purposes that may be desired, the feed of the materials and the article through the apparatus need not necessarily be completely continuous, but may be interrupted, at least for intervals of time such as required to cut off lengths of formed article, or to perform other desired operations on the articles being produced. While for many purposes it would be preferred to operate the apparatus continuously, various features of the invention are also applicable where the feed is interrupted or is intermittent, although it should be noted that even in such event, if desired, the method and apparatus may nevertheless be employed in the production of articles or pieces of continuous or indefinite length. The word "continuous" therefore is used herein in a broad sense, although it is not intended to apply to such operations as the piecemeal formation of articles by means of mating molds which are opened and closed for each operation.

It should still further be understood that the number and arrangement of strips being fed will vary according to the cross section of the piece being formed, the shape of the forming device itself also being varied according to the shape of the piece desired.

The forming device desirably has a smooth or polished surface, or may be coated with a material such as polytetrafluoroethylene, in order to reduce sticking and facilitate drawing the piece through the forming device.

Attention is called to the fact that certain of the subject matter disclosed in the present application is also disclosed and claimed in my copending application Serial No. 115,633, filed June 8, 1961.

I claim:

1. In the formation of a fibre reinforced resin article by feeding a heat hardenable liquid resin material and reinforcing fibres through a confining channel having a portion of substantial length and of uniform cross sectional shape conforming with the cross sectional shape of an article having an edge portion of considerable width as compared to its thickness, the method which comprises impregnating with a heat hardenable liquid resin material a fibrous reinforcement strip of matted glass fibers, feeding the impregnated strip through the confining channel in the portion thereof conforming with said edge portion of the article longitudinally, feeding a fibrous roving through the confining channel in the portion thereof conforming with the extremity of said edge portion and heating the resin to harden it while in confinement in said portion of the confining channel of uniform cross sectional shape.

2. A method according to claim 1 in which said fibrous roving fed into the confining channel is an unimpregnated roving and in which the resin impregnated strip carries sufficient resin material to saturate said roving in said confining channel.

References Cited by the Examiner
UNITED STATES PATENTS
2,871,911  2/1959  Goldsworthy et al. ___ 156—441

ROBERT F. WHITE, *Primary Examiner.*
J. A. FINLAYSON, *Assistant Examiner.*